United States Patent
Banno (10) Patent No.: US 9,686,264 B2
(45) Date of Patent: Jun. 20, 2017

(54) SERVICE PROVIDING APPARATUS, STORAGE MEDIUM AND SERVICE PROVIDING METHOD

(71) Applicant: BROTHER KOGYO KABUSHIKI KAISHA, Nagoya-shi, Aichi-ken (JP)

(72) Inventor: Hirokazu Banno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 81 days.

(21) Appl. No.: 14/867,383

(22) Filed: Sep. 28, 2015

(65) Prior Publication Data

US 2016/0094534 A1 Mar. 31, 2016

(30) Foreign Application Priority Data

Sep. 29, 2014 (JP) ................................. 2014-199413

(51) Int. Cl.
*H04L 29/06* (2006.01)
*G06F 17/30* (2006.01)
(Continued)

(52) U.S. Cl.
CPC .......... *H04L 63/08* (2013.01); *G06F 17/3089* (2013.01); *H04L 63/105* (2013.01);
(Continued)

(58) Field of Classification Search
CPC ................................. H04L 63/08; H04L 67/02
See application file for complete search history.

(56) References Cited

U.S. PATENT DOCUMENTS

| 8,667,579 B2 * | 3/2014 | Leeder | H04L 63/0815 713/185 |
| 2002/0133720 A1 * | 9/2002 | Sherman | H04L 63/0236 726/13 |

(Continued)

FOREIGN PATENT DOCUMENTS

JP 2001-325229 A 11/2001

OTHER PUBLICATIONS

U.S. Appl. No. 14/670,997, filed Mar. 27, 2015.
(Continued)

*Primary Examiner* — Dao Ho
(74) *Attorney, Agent, or Firm* — Scully, Scott, Murphy & Presser, PC (57) ABSTRACT

A service providing apparatus configured to acquire a resource request from a terminal apparatus, specify destination information, which is associated with authentication information stored in a storage and coinciding with authentication information included in the acquired resource request, from the storage, determine whether domain information included in the acquired resource request and the specified destination information coincide with each other, and transmit a first response including information indicating that authentication is required and the domain information to the terminal apparatus when the domain information and the destination information coincide with each other, and transmit a second response not including the domain information to the terminal apparatus when the domain information and the destination information do not coincide with each other.

12 Claims, 7 Drawing Sheets

(51) Int. Cl.
*H04L 29/08* (2006.01)
*H04L 29/12* (2006.01)

(52) U.S. Cl.
CPC .......... *H04L 61/303* (2013.01); *H04L 63/168* (2013.01); *H04L 67/02* (2013.01)

(56) References Cited

U.S. PATENT DOCUMENTS

| | | | | |
|---|---|---|---|---|
| 2004/0044768 | A1* | 3/2004 | Takahashi | H04L 29/06 709/225 |
| 2005/0235044 | A1* | 10/2005 | Tazuma | G06F 17/30887 709/217 |
| 2012/0210448 | A1* | 8/2012 | Vrancken | G06F 21/31 726/29 |
| 2013/0268680 | A1* | 10/2013 | Marton | H04L 63/0815 709/226 |
| 2014/0068746 | A1* | 3/2014 | Gonzalez Martinez | H04L 63/0884 726/9 |
| 2014/0096224 | A1* | 4/2014 | Liu | H04L 63/08 726/9 |

OTHER PUBLICATIONS

World W.W. Consortium, W3C, XML HttpRequest Level 2, W3C Working Draft, Jan. 17, 2012, pp. 1/18 http://www.w3.org/TR/2012/WD-XMLHttpRequest-20120117/ 27/06/25.

* cited by examiner

| RECORD ID | SERVICE NAME | CLIENT ID | SECRET ID | REDIRECT URI | HIERARCHICAL INFORMATION |
|---|---|---|---|---|---|
| 1 | qux | d21c9d881eba | c4ca4238a0b | https://qux.example.com | example.com |
| 2 | YYYYY | bd86ab5c9tf0c | efab45de2b8 | https://www.example.jp | www.example.jp |
| 3 | ZZZZZ | a6e7c22353e6 | a0b923820dc | https://www.example.net | example.net |

FIG. 5

| RECORD ID | USER ID | APPLICATION ID | ACCESS TOKEN |
|---|---|---|---|
| 1 | 423 | 1 | d21c9d881eba6988be480efab45de2b9 |
| 2 | 657 | 3 | 46cd618b83bec844b0dc2c7258f4de11 |
| 3 | 987 | 1 | 78679495fe70bfa486d8aaff1a2e4aa9 |

```
HTTP RESPONSE

HTTP/1.1 200 OK
Date: Mon, 01 Dec 2008 00:23:53 GMT
Server: Apache
Access-Control-Allow-Credential: true
Access-Control-Allow-Headers: Authorization
Access-Control-Allow-Method: GET, POST, OPTIONS, PUT, DELETE
Access-Control-Allow-Origin:
```

FIG. 9

```
HTTP RESPONSE

HTTP/1.1 403 Forbidden
Date: Mon, 01 Dec 2008 00:23:53 GMT
Server: Apache
```

SERVICE PROVIDING APPARATUS, STORAGE MEDIUM AND SERVICE PROVIDING METHOD

CROSS-REFERENCE TO RELATED APPLICATIONS

This application claims priority from Japanese Patent Application No. 2014-199413 filed on Sep. 29, 2014, the entire contents of which are incorporated herein by reference.

TECHNICAL FIELD

The disclosure relates to a service providing apparatus, a storage medium storing a program and a service providing method.

BACKGROUND

By the World Wide Web Consortium, a technology for using the Internet has been standardized. For example, XMLHttpRequest Level 2 is disclosed in related-art. When the technology is used, for example, the following communication can be performed. Here, it is assumed that a specific Web service provided by a specific service client is used through a Web browser by a JAVASCRIPT™ application in a terminal apparatus that a user operates. At this state, the terminal apparatus can access information of a Web service, which is provided by an external service providing apparatus having a domain different from the of the specific service client, through the Web browser. As a result, it is possible to display the information of the Web service, which is provided by the service providing apparatus, on the Web browser on which a display corresponding to the specific Web service is made.

SUMMARY

According to an aspect of the disclosure, there is provided a service providing apparatus configured to provide a first Web service through the Internet, the service providing apparatus including: a storage; a communication device configured to connect the service providing apparatus to the Internet; a hardware processor; and memory storing computer executable instructions, when executed by the hardware processor, causing the service providing apparatus to perform: acquiring a resource request through the communication device, the resource request requesting connection to a resource corresponding to the first Web service, being transmitted from a terminal apparatus having accessed through a Web browser a first service client configured to provide a second Web service, and including domain information of the first service client and authentication information related to the connection to the resource corresponding to the first Web service and issued in correspondence to a second service client configured to provide a third Web service, specifying, from the storage, destination information which is associated with the authentication information stored in the storage and coinciding with the authentication information included in the acquired resource request, the storage being configured to store, in association with each other, first identification information corresponding to a predetermined service client configured to provide a predetermined Web service, the destination information corresponding to an address to which permission information permitting connection to the resource corresponding to the first Web service is to be transmitted, and the authentication information related to the connection to the resource corresponding to the first Web service and issued in correspondence to the predetermined service client identified by the first identification information; determining whether the domain information included in the acquired resource request and the specified destination information coincide with each other, and transmitting a first response to the resource request from the communication device to the terminal apparatus when the domain information and the destination information coincide with each other, and transmitting a second response to the resource request from the communication device to the terminal apparatus when the domain information and the destination information do not coincide with each other, the first response including information indicating that authentication is required and the domain information, and the second response not including the domain information.

According to another aspect of the disclosure, there is provided a non-transitory computer readable storage medium storing a program, when executed by a hardware processor, causing a service providing apparatus configured to provide a first Web service through the Internet to perform: acquiring a resource request through a communication device of the service providing apparatus configured to connect the service providing apparatus to the Internet, the resource request requesting connection to a resource corresponding to the first Web service, being transmitted from a terminal apparatus having accessed through a Web browser a first service client configured to provide a second Web service, and including domain information of the first service client and authentication information related to the connection to the resource corresponding to the first Web service and issued in correspondence to a second service client configured to provide a third Web service; specifying, from a storage, destination information which is associated with authentication information stored in the storage and coinciding with the authentication information included in the acquired resource request, the storage being configured to store, in association with each other, first identification information corresponding to a predetermined service client configured to provide a predetermined Web service, the destination information corresponding to an address to which permission information permitting connection to the resource corresponding to the first Web service is to be transmitted, and the authentication information related to the connection to the resource corresponding to the first Web service and issued in correspondence to the predetermined service client identified by the first identification information; determining whether the domain information included in the acquired resource request and the specified destination information coincide with each other; and transmitting a first response to the resource request from the communication device to the terminal apparatus when the domain information and the destination information coincide with each other, and transmitting a second response to the resource request from the communication device to the terminal apparatus when the domain information and the destination information do not coincide with each other, the first response including information indicating that authentication is required and the domain information, and the second response not including the domain information.

According to another aspect of the disclosure, there is provided a service providing method for a service providing apparatus configured to provide a first Web service through the Internet, the method including: acquiring a resource request through a communication device of the service providing apparatus configured to connect the service providing apparatus to the Internet, the resource request requesting connection to a resource corresponding to the first Web service, being transmitted from a terminal apparatus having accessed through a Web browser a first service client configured to provide a second Web service, and including domain information of the first service client and authentication information related to the connection to the resource corresponding to the first Web service and issued in correspondence to a second service client configured to provide a third Web service; specifying, from a storage, destination information which is associated with authentication information stored in the storage and coinciding with the authentication information included in the acquired resource request, the storage being configured to store, in association with each other, first identification information corresponding to a predetermined service client configured to provide a predetermined Web service, the destination information corresponding to an address to which permission information permitting connection to the resource corresponding to the first Web service is to be transmitted, and the authentication information related to the connection to the resource corresponding to the first Web service and issued in correspondence to the predetermined service client identified by the first identification information; determining whether the domain information included in the acquired resource request and the specified destination information coincide with each other; and transmitting a first response to the resource request from the communication device to the terminal apparatus when the domain information and the destination information coincide with each other, and transmitting a second response to the resource request from the communication device to the terminal apparatus when the domain information and the destination information do not coincide with each other, the first response including information indicating that authentication is required and the domain information, and the second response not including the domain information.

DETAILED DESCRIPTION

In case of a Web service that is used by many access sources, service clients may be arranged at a plurality of different places. For example, the respective service clients are allotted with different sub-domains, and a service client close to a communication environment of an access source is used. Here, it is assumed that communication is performed from a Web service provided by a specific service client to another Web service, which is provided by an external service providing apparatus having a different base site domain and requires authentication, through a JAVASCRIPT™ application program mounted in the Web browser. For the communication, the standardized XMLHttpRequest protocol is used, for example. In the XMLHttpRequest protocol, due to the specification thereof, it is not possible to permit an access to a resource, which requires the authentication, from an arbitrary domain (service client). In the XMLHttpRequest protocol, for the resource which requires the authentication, it is necessary to designate a specific domain from which the access to the resource is permitted. However, as described above, when the domain becoming the access source is not constant, it is not possible to determine whether the access source is a domain which should be permitted. As a result, there is a possibility that the communication cannot be established between the resource which requires the authentication and the service clients allotted with different sub-domains. In the meantime, a method of designating a connection source domain name as the specific domain from which the access is permitted may be considered. However, if the communication is established with all the domains irrespective of the connection source, security vulnerability may arise.

An example of an object of one aspect of the disclosure is to provide a service providing apparatus, a storage medium storing a program and a service providing method, by which smooth cooperation with a specific Web service is possible while maintaining the security.

Hereinafter, an illustrative embodiment of the disclosure will be described with reference to the drawings. The disclosure is not limited to the configurations to be described below, and a variety of configurations within the same technical spirit can be adopted. For example, a part of the configurations to be described below may be omitted or replaced with other configurations. Also, other configurations may be included.

<Web Service System>

Figure 1:
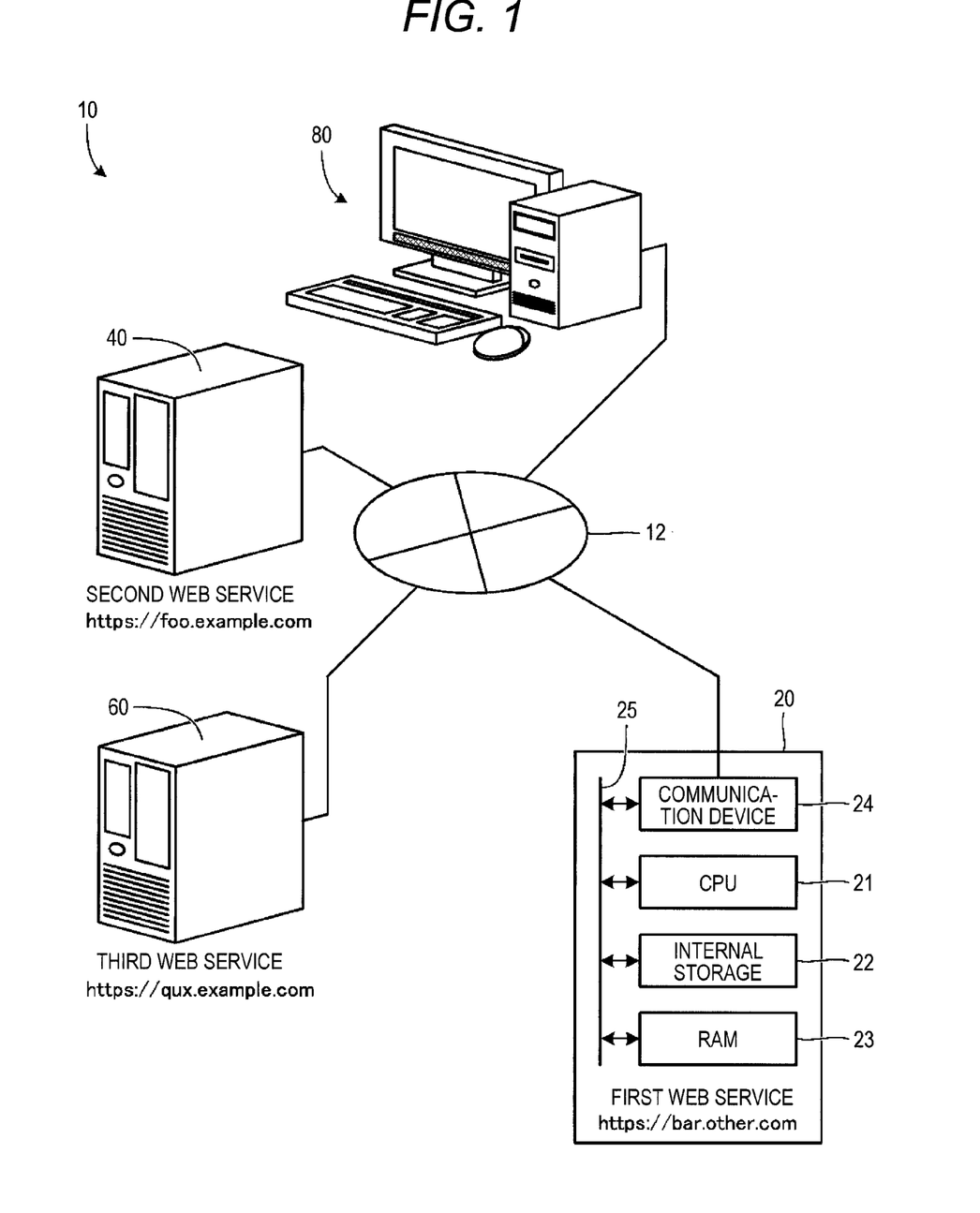
FIG. 1 illustrates a schematic configuration of a Web service system.

A Web service system includes a service providing apparatus 20, a first service client 40, and a second service client 60. In the Web service system 10, the service providing apparatus 20, the first service client 40, and the second service client 60 are connected to the Internet 12. A plurality of terminal apparatuses is connected to the Internet 12. The terminal apparatuses are operated by a user of each terminal apparatus. The user of each terminal apparatus can connect to the Internet 12 through the terminal apparatus. In FIG. 1, one terminal apparatus that is used for description of the illustrative embodiment is shown. In the illustrative embodiment, the one terminal apparatus is referred to as 'user terminal 80'.

The service providing apparatus 20 is a server apparatus that provides a first Web service. The service providing apparatus 20 will be described in detail later. The first service client 40 provides a second Web service. The second service client 60 provides a third Web service. The service client 40 and the service client 60 acts as consumers, while the service providing apparatus 20 acts as a provider. In terms of the hardware, the first service client 40 and the second service client 60 may be general-purpose server apparatus, which has already been practically used. The provision of the second Web service by the first service client 40 and the provision of the third Web service by the second service client 60 are made by a conventional method. For this reason, the descriptions of the first service client 40 and the second service client 60 will be appropriately omitted.

In the illustrative embodiment, it is assumed that domain information of the service providing apparatus 20 that provides the first Web service is 'bar.other.com' and a URI thereof is 'https://bar.other.com'. It is also assumed that domain information of the first service client 40 that provides the second Web service is 'foo.example.com' and a URI thereof is 'https://foo.example.com'. It is also assumed that domain information of the second service client 60 that provides the third Web service is 'qux.example.com' and a URI thereof is 'https://qux.example.com'. Regarding the first service client 40 and the second service client 60, 'foo.example.com' and 'qux.example.com' are sub-domains of a base domain 'example.com'. The first service client 40 and the second service client 60 may be used through a portal site. A URI of the portal site is 'https://portal.example.com', for example.

In the Web service system 10, for example, the following processing can be implemented. It is assumed that the user who operates the user terminal 80 is registered for the first Web service, the second Web service and the third Web service and can use the respective services. It is assumed that the first Web service is a data storage service. It is assumed that the second Web service is a social networking service. It is assumed that the third Web service is an email service. For example, the user can post photograph data stored in the first Web service to the second Web service by causing the first Web service and the second Web service to cooperate with each other. The user can attach the photograph data stored in the first Web service to an email and transmit an email having the photograph data attached thereto by causing the first Web service and the third Web service to cooperate with each other. For the cooperation of services, an API (Application Programming Interface) for a Web service is used.

The user terminal 80 is a well-known information processing apparatus having a communication function. In the user terminal 80, a Web browser is installed. The access to the Internet 12 is performed through the Web browser. On the Web browser, a JAVASCRIPT' application for a Web service of an access destination operates. The application is transmitted from the access destination to the user terminal 80. As the user terminal 80, for example, a personal computer, a tablet terminal or a smart phone may be exemplified. The descriptions of the user terminal 80 are appropriately omitted.

<Service Providing Apparatus>

The service providing apparatus 20 will be described with reference to FIG. 1. The service providing apparatus 20 has a CPU 21, an internal storage 22, a RAM 23, and a communication device 24. The respective units 21 to 24 are connected to a bus 25. The CPU 21 executes arithmetic processing. The CPU 21 is an example of a hardware processor. The hardware processor may be any processor excluding software. The internal storage 22 is configured by a computer-readable storage medium. For example, the internal storage 22 is configured by a hard disk drive and/or a flash memory. In addition, the internal storage 22 may include a ROM. In the internal storage 22, a variety of programs are stored. For example, an OS (Operating System) and a variety of applications are stored in the internal storage 22. The applications that are stored in the internal storage 22 include a program of reception processing (see FIG. 2) and a program of acquisition determination processing (see FIG. 6), which will be described later. For example, the applications are pre-installed in the internal storage 22.

The pre-install is made by reading a program stored in a computer-readable storage medium such as a semiconductor memory with a reading unit (not shown) of the service providing apparatus 20. When the service providing apparatus 20 has an optical drive (not shown), for example, the pre-install may be made by reading a program stored in an optical medium with the optical drive. In addition, the pre-install may be made as a program stored in a computer-readable storage medium such as a hard disk drive of a server apparatus separate from the service providing apparatus 20 connected to the Internet 12 is received as a transmission signal at the communication device 24. The method of the pre-install is appropriately determined, considering the various situations. The computer-readable storage medium may be a non-transitory storage medium, which does not include a transitory medium (for example, transmission signal). The non-transitory storage medium may be a storage medium capable of storing the information, irrespective of a time period for which the information is stored.

The RAM 23 serves as a storage area that is used when the CPU 21 executes the various programs. In the RAM 23, predetermined data and information, which are used for processing, are stored in a predetermined storage area during execution of the processing. For example, in the RAM 23, a first database (see FIG. 3) and a second database (see FIG. 5) are stored. However, the first database and the second database may be stored in another storage (e.g., the internal storage 22, an external storage connected via the Internet 12). In the service providing apparatus 20, the CPU 21 controls the service providing apparatus 20 by executing the OS and the respective programs for the reception processing (FIG. 2) and the acquisition determination processing (FIG. 6), which are stored in the internal storage 22. Thereby, in the service providing apparatus 20, a variety of function units are implemented.

The communication device 24 connects the service providing apparatus 20 to the Internet 12 and performs data communication through the Internet 12. For example, in the service providing apparatus 20, a variety of commands and data are transmitted and received to and from the user terminal 80 through the communication device 24. The communication device 24 is an interface circuit suitable for the ETHERNET' standards, for example. The connection to the Internet 12 by the communication device 24 is made by a hard-wired connection method. However, the connection to the Internet 12 by the communication device 24 may also be made by a wireless connection device The service providing apparatus 20 is different from the well-known server apparatus in that the program of the acquisition determination processing shown in FIG. 6 is stored in the internal storage 22 and the first database (FIG. 3) and the second database (FIG. 5) are used in the acquisition determination processing. However, the service providing apparatus 20 is the same server apparatus as the well-known server apparatus in terms of the hardware. Therefore, although the descriptions have been omitted, in addition to the respective units 21 to 25, the service providing apparatus 20 has the configuration of the well-known server apparatus.

<Reception Processing>

Figure 2:
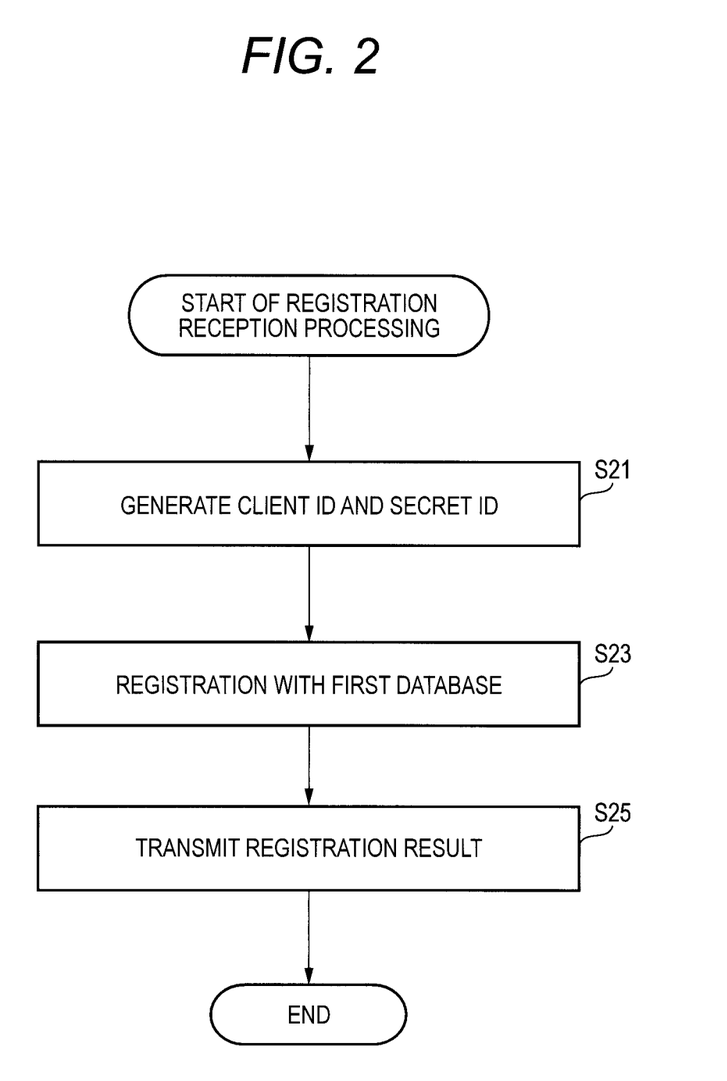
FIG. 2 is a flowchart of reception processing.

The reception processing that is executed by the service providing apparatus 20 will be described with reference to FIG. 2. The reception processing is executed in advance, when causing a service, which is provided by the service client including the first service client 40 and the second service client 60, to cooperate with the first Web service. The reception processing starts when a registration request from the service client is received by the service providing apparatus 20, for example. The registration request is transmitted from the service client, which is a request source, through the Internet 12 and is received at the communication device 24, for example. The CPU 21 acquires the registration request through the communication device 24 and starts the reception processing.

The CPU 21 having started the reception processing generates a client ID and a secret ID (S21). The client ID is identification information for identifying the service client, and is unique to each service client. The secret ID is an ID that is used for an electronic signature. The secret ID is also referred to as a consumer secret. The secret ID is the information that is also used in the well-known OAuth authentication. For this reason, the other descriptions of the secret ID are omitted.

Then, the CPU 21 controls registration of predetermined information to the first database (S23). As described above, the first database is stored in the RAM 23 or the internal storage 22. Information (e.g., a record ID, a service name, a client ID, a secret ID, a redirect URI and hierarchical information) are registered in the first database. By the reception processing, the respective information registered in S23 is stored the first database in association with each other (see FIG. 3).

The record ID is a serial number for identifying a record stored in the first database. The service name is a name of a service that is provided by the service client, which is a registration target. For example, when the registration target is the second service client 60, a name of the second Web service 'qux' is registered as the service name. The client ID and the secret ID are the information generated in S21. The redirect URI is an example of destination information corresponding to an address to which a permission code is transmitted. The transmission of the permission code will be described later. The hierarchical information is information indicating a domain hierarchy of the redirect URI, which becomes a determination condition of the identicalness of the domain information in S39 of the acquisition determination processing shown in FIG. 6. For example, when the redirect URI is 'https://qux.example.com', the coincidence up to a second level domain is set as the determination condition. In this case, the hierarchical information is 'example.com'.

In S23, the record ID is automatically generated. The service name, the redirect URI and the hierarchical information are obtained in response to a request from the service client that provides a service of a registration target. That is, the registration request includes the service name, the redirect URI and the hierarchical information. The CPU 21 acquires the respective information from the acquired registration request.

The CPU 21 controls transmission of the registration result registered in the first database in S23 (S25). The CPU 21 outputs a transmission command of the registration result to the communication device 24. Accompanied by this, the registration result is transmitted from the communication device 24 to the service client, which is a transmission source of the registration request. The registration result transmitted in S25 includes all the information registered in the first database in S23. For example, it is assumed that the registration request has been transmitted from the second service client 60. In this case, the registration result is transmitted from the communication device 24 to the second service client 60. The transmitted registration result includes all the information included in the record of the record ID '1'. Here, the information to be included in the registration result may also be a part of the respective information. Also in this case, the client ID is included in the part of the respective information in the registration result. In the meantime, when the record ID '1' is registered by this reception processing, the corresponding registration is made at a state where any information is not stored in the first database. After S25, the CPU 21 ends the reception processing.

<OAuth Authentication>

When causing the first Web service and the second Web service or the first Web service and the third Web service to cooperate with each other, like the well-known Web service system, the OAuth authentication is performed by the OAuth protocol. An outline of the OAuth authentication will be described with reference to FIG. 4. In this description, the service providing apparatus 20 that provides the first Web service and the second service client 60 that provides the third Web service are exemplified. In the first database shown in FIG. 3, the record ID '1' is a record corresponding to the second service client 60 that provides the third Web service.

Figure 4:
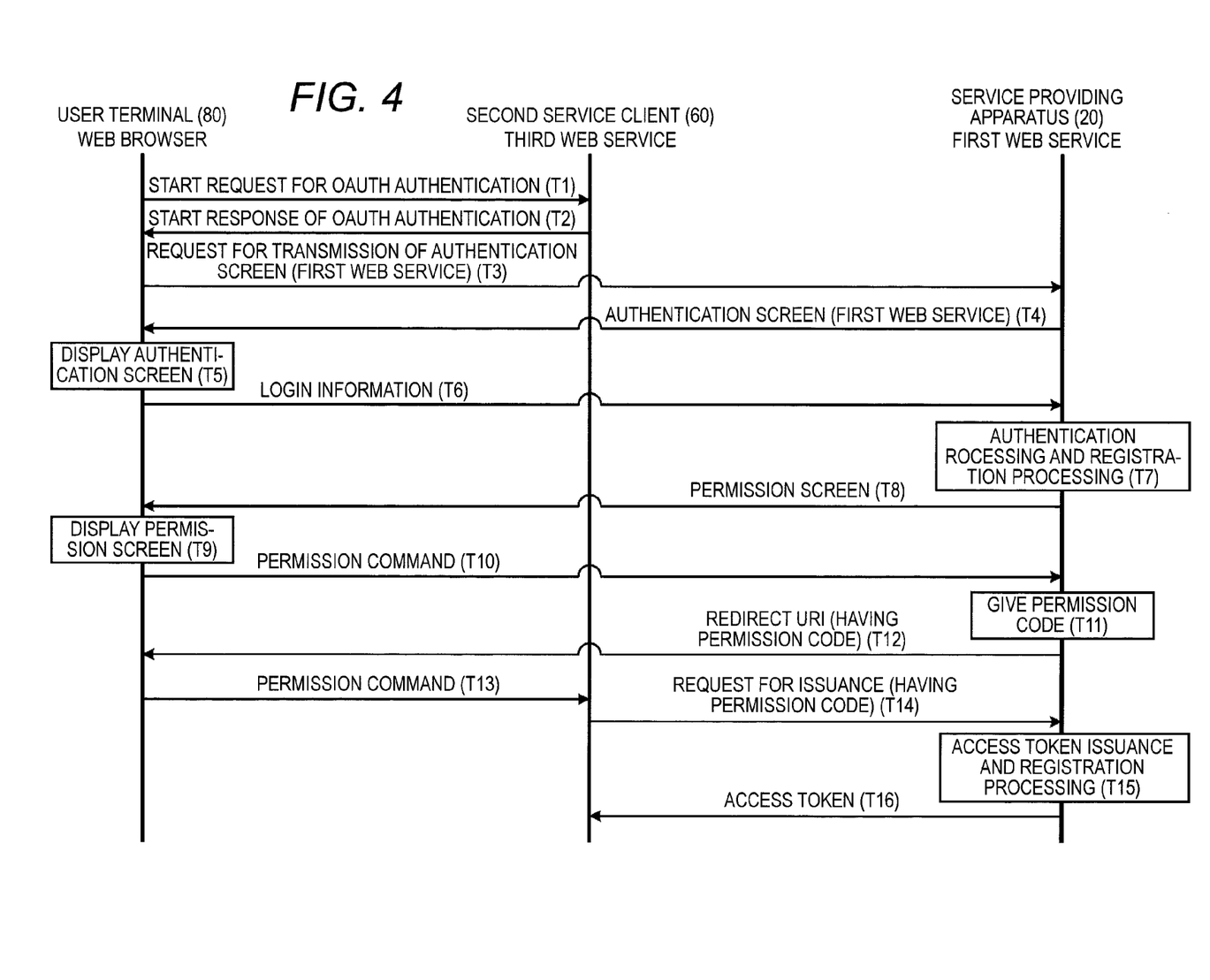
FIG. 4 is a sequence diagram showing an example of a procedure of OAuth authentication.

At the user terminal 80, the user activates the Web browser and inputs a predetermined operation to the Web browser through an operation unit of the user terminal 80. For example, the user inputs to the Web browser an access operation to the second service client 60 (the third Web service). Accompanied by this, the Web browser accesses the second service client 60 in accordance with the URI 'https://qux.example.com' of the second service client 60. In the user terminal 80, a service screen of the third Web service is displayed on the Web browser. On the Web browser, a JAVASCRIPT™ application for the third Web service is executed. The JAVASCRIPT™ application for the third Web service may be downloaded when the Web browser accesses the second service client 60, for example.

Then, the user performs an operation of the OAuth authentication on the Web browser. Accompanied by this, a start request for the OAuth authentication is transmitted from the user terminal 80 to the second service client 60 (T1). From the second service client 60, a start response of the OAuth authentication is transmitted to the user terminal 80, in response to the start request of the OAuth authentication (T2). The start response of the OAuth authentication includes a URI for authentication corresponding to the service providing apparatus 20 that provides the first Web service. From the user terminal 80, a request for transmission of an authentication screen for the first Web service is transmitted to the service providing apparatus 20, in accordance with the URI included in the start response of the OAuth authentication (T3).

From the service providing apparatus 20, data corresponding to an authentication screen for the first Web service is transmitted to the user terminal 80, in response to the request for transmission in T3 (T4). In the user terminal 80 having received the data, an authentication screen for the first Web service is displayed on the Web browser (T5). The user inputs login information through the operation unit of the user terminal 80. The user terminal 80 receives the input login information, and transmits the received login information to the service providing apparatus 20 (T6). In the service providing apparatus 20, the authentication processing is executed on the basis of the login information transmitted from the user terminal 80 (T7).

Figure 5:
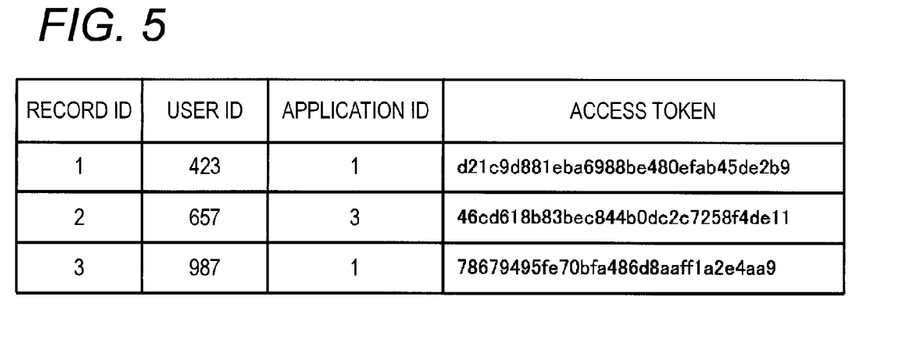
FIG. 5 shows an example of a second database.
Figure 6:
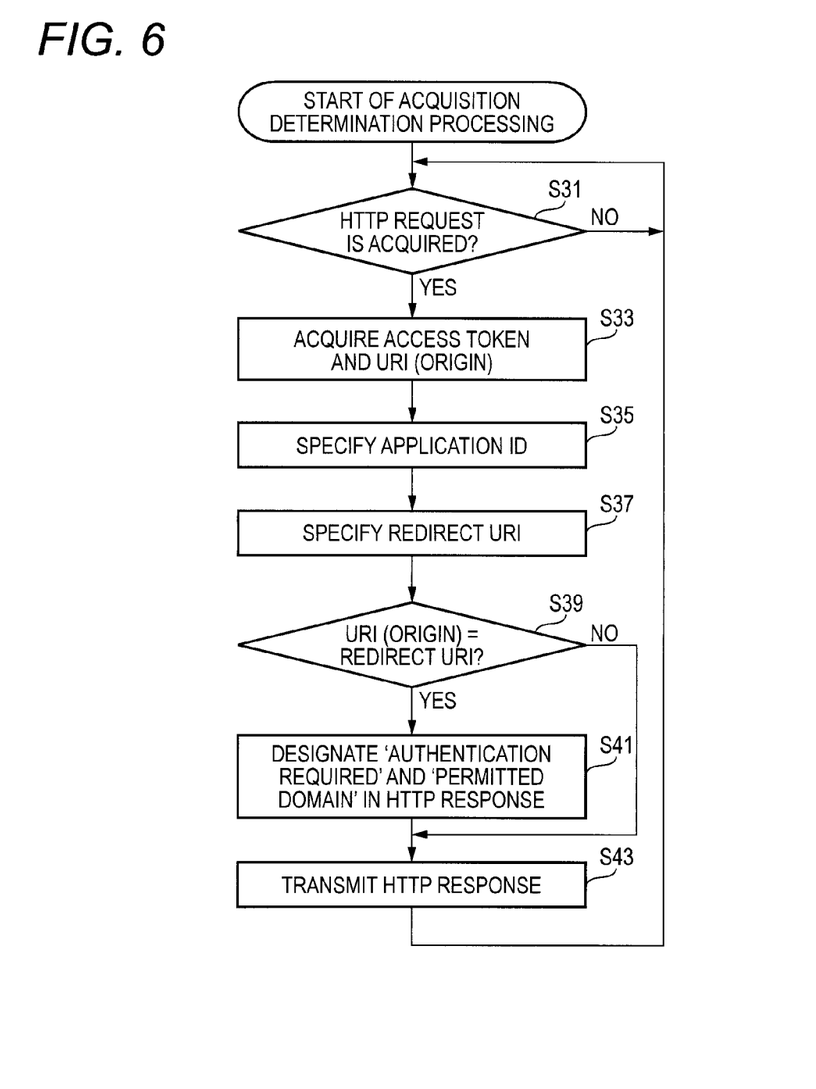
FIG. 6 is a flowchart of acquisition determination processing.

In T7, when the login information is proper, a user ID and an application ID are registered in association with each other in the second database (see FIG. 5). In the service providing apparatus 20, as described above, the second database is stored in the RAM 23 or the internal storage 22. The application ID serving as a registration target corresponds to the service client that provides the Web service, which is a cooperation target. In the illustrative embodiment, the record ID associated with a client ID in the first database is registered in the second database as the application ID. The client ID is a client ID corresponding to the service client that provides the Web service, which is a cooperation target. Therefore, in the case of the second service client 60, the record ID '1' is registered as the application ID (see FIGS. 3 and 5). By the record ID of the first database and the application ID of the second database, it is possible to associate the record stored in the first database and the record stored in the second database.

When the login information is proper, data corresponding to a permission screen is transmitted from the service providing apparatus 20 to the user terminal 80 (T8). In the user terminal 80 having received the data corresponding to the permission screen, a permission screen is displayed on the Web browser (T9). The permission screen is a screen for asking the user to select whether connection to a resource of the user using the API of the first Web service is permitted or not. The permission screen includes an OK button and a cancel button, for example. The OK button is associated with the permission and the cancel button is associated with the disapproval. The user inputs an operation on any one of the OK button and the cancel button through the operation unit of the user terminal 80. When an operation on the OK button is received, the user terminal 80 transmits a permission command to the service providing apparatus 20 (T10). In the service providing apparatus 20, a permission code is given to the redirect URI, as an argument, in response to the permission command (T11).

Figure 3:
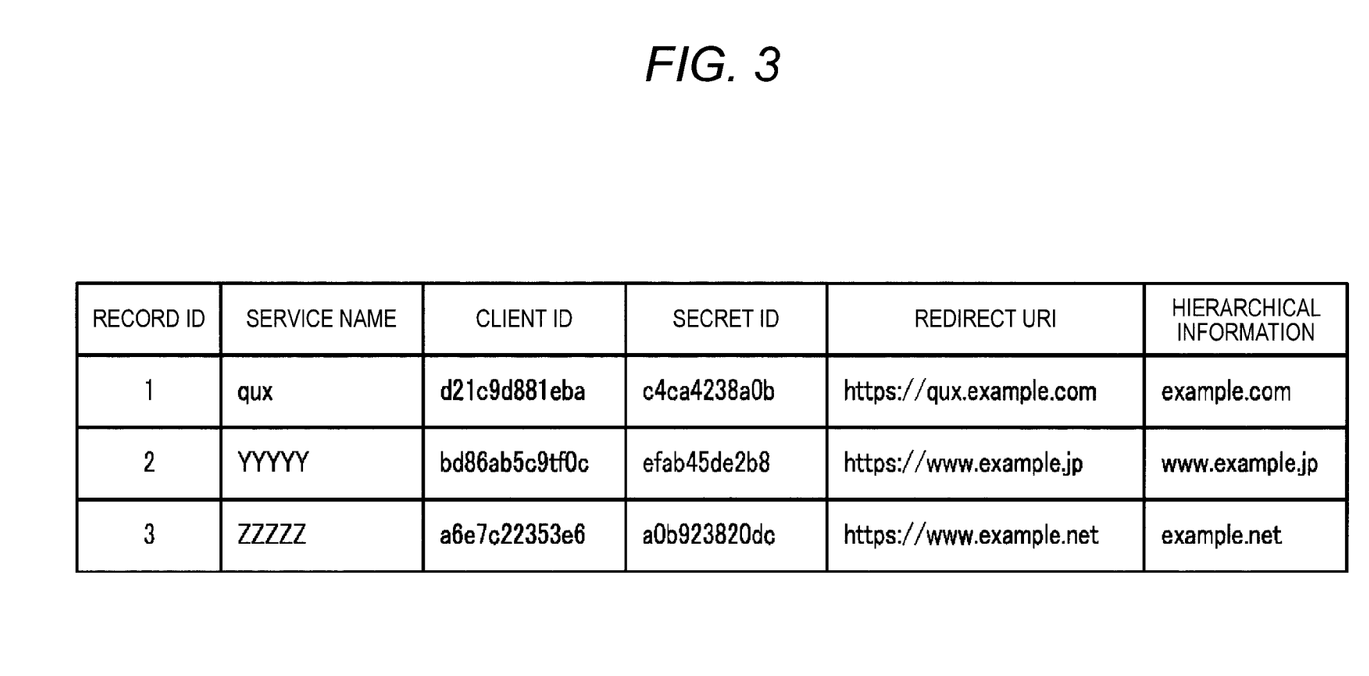
FIG. 3 shows an example of a first database.

The processing of T11 will be described with reference to the second service client 60, as an example. In this case, the redirect URI, which is associated with the record ID '1' in the first database of FIG. 3, is 'https://qux.example.com'. The permission code is to be given to the redirect URI. In the service providing apparatus 20, the permission code is generated. The permission code is permission information that permits the connection to the resource of the user using the API of the first Web service. The resource is data corresponding to the first Web service that is managed by the service providing apparatus 20, for example. When the first Web service is the data storage service, the resource of the user is, for example, photograph data that is stored using the first Web service by the user.

Then, the service providing apparatus 20 transmits the redirect URI having the permission code given thereto to the user terminal 80 (T12). In the user terminal 80, the access destination on the Web browser moves to the redirect URI 'https://qux.example.com' to which the permission code has been given. At this time, the user terminal 80 transmits the permission code, as an argument of the redirect URI, to the second service client 60 (T13). The second service client 60 having received the permission code transmits a request for issuance to the service providing apparatus 20. The request for issuance is a command for requesting the service providing apparatus 20 to issue an access token. The access token is authentication information that is to be used when the connection to the resource of the user is made in the first Web service. The request for issuance includes the permission code received in T13. In addition, the request for issuance includes the client ID included in the registration result that is received by the second service client 60, for example. The registration result is transmitted from the service providing apparatus 20 to the second service client 60 in S25 of the reception processing shown in FIG. 2. The request for issuance may include the secret ID that is included in the registration result received by the second service client 60.

In the service providing apparatus 20, an access token is issued in response to the request for issuance in T14 (T15). In T15, the issued access token is registered in the second database. At this time, the access token is registered in association with the user ID and the application ID registered in the second database in previous T7. In the illustrative embodiment, in T15, the access token 'd21c9d881eba6988be480efab45de2b9' is generated in response to the request for issuance transmitted from the second service client 60 and is then registered in the second database. Thereby, in the second database, the user ID '423', the application ID '1' and the access token 'd21c9d881eba6988be480efab45de2b9' are stored in association with each other (see FIG. 5). Also in the second database, like the first database, the record ID is associated with each record in which the user ID, the application ID and the access token are stored. The record ID of the second database is a serial number for identifying the record stored in the second database.

Then, the service providing apparatus 20 transmits the issued access token to the second service client 60, which is the request source (T16). Thereby, the OAuth authentication is over. The access token issued in correspondence to the second service client 60 can also be used in the first service client 40 of which the base domain is common.

<Acquisition Determination Processing>

The acquisition determination processing that is executed by the service providing apparatus 20 will be described with reference to FIG. 6. As described above, in the user terminal 80, the OAuth authentication is executed, and the cooperation of the first Web service and the second Web service are implemented. At this state, it is assumed that in the user terminal 80, the access destination through the Web browser is changed from the second service client 60 to the first service client 40 of which the base domain is common. In this case, a JAVASCRIPT™ application for the second Web service is transmitted from the first service client 40 to the user terminal 80. Further, the access token, which has been issued in correspondence to the second service client 60 in the OAuth authentication, is transmitted from the first service client 40 to the user terminal 80. It is assumed that, between the service clients having the same base domain, an access token issued for one service client is shared by the other service client together with the URI of the service providing apparatus 20 (the issuance source). That is, it is assumed that the access token issued in correspondence to the second service client 60 is also preserved in the first service client 40, together with the URI of the service providing apparatus 20.

On the Web browser, the JAVASCRIPT™) application for the second Web service is executed. In the user terminal 80, respective communications with the service providing apparatus 20 and the first service client 40 through the Web browser is implemented by the JAVASCRIPT™ application for the second Web service. The communication is performed in accordance with XMLHttpRequest Level 2, for example. With XMLHttpRequest Level 2, the JAVASCRIPT™ application can perform communication with a plurality of domains (i.e., cross domains).

The acquisition determination processing is executed at the above-described state, for example. The CPU 21 having started the acquisition determination processing determines whether an HTTP request from the user terminal 80 is acquired (S31). The HTTP request is received by the communication device 24. The CPU 21 acquires the HTTP request through the communication device 24. The HTTP request acquired in S31 is a resource request for requesting connection to the resource of the user using the API of the first Web service. The acquired HTTP request is stored in the RAM 23.

Figure 7:
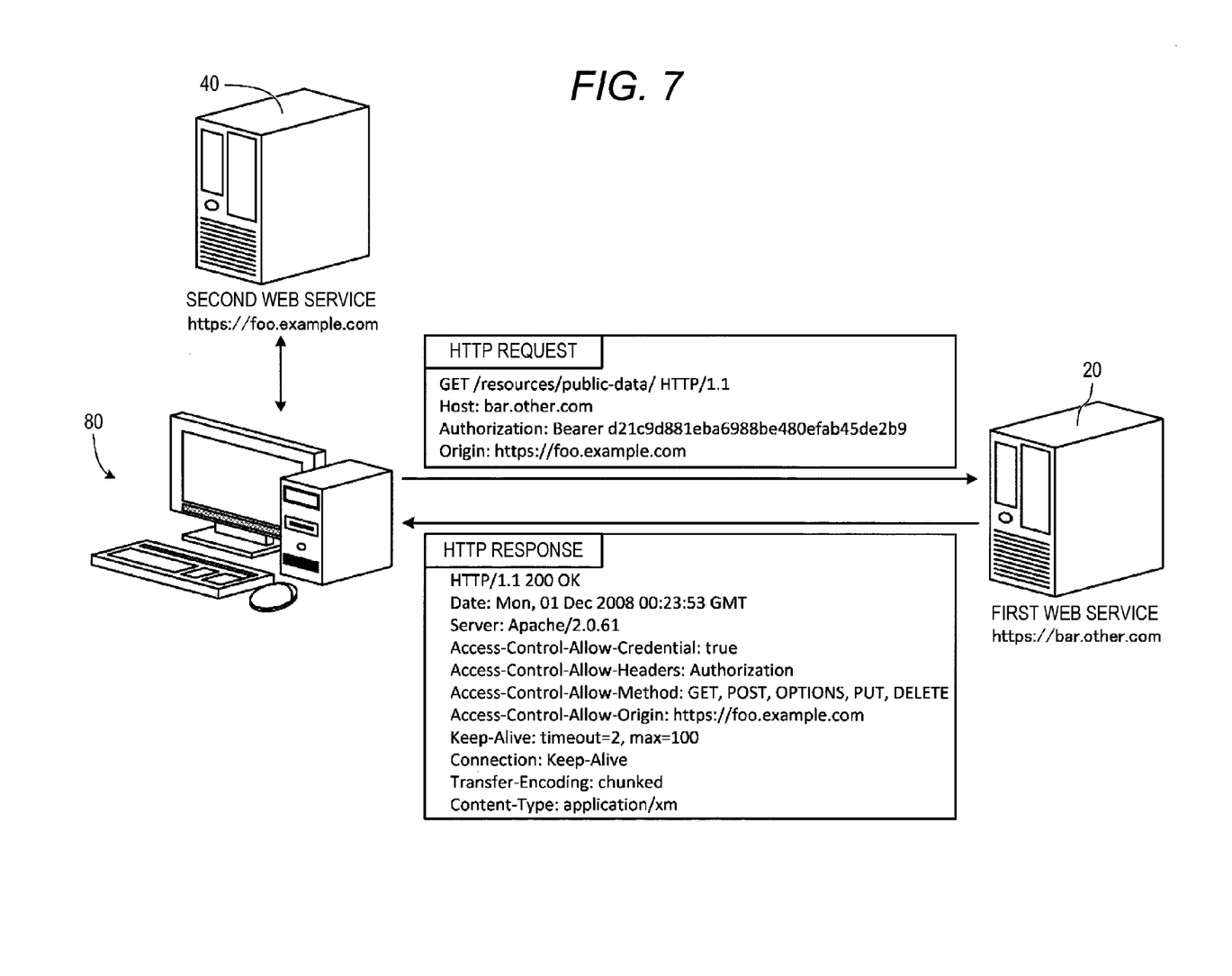
FIG. 7 illustrates an example of communication performed between a user terminal and a service providing apparatus.

The HTTP request, which is the resource request, includes the access token and an origin. According to the example of the illustrative embodiment, the HTTP request acquired in S31 includes as the access token, 'd21c9d881eba6988be480efab45de2b9', as shown in FIG. 7 (see 'Authorization:' of the HTTP request). The HTTP request includes URI 'https://foo.example.com' including the domain information of the access source, as the origin, as shown in FIG. 7 (see 'Origin:' of the HTTP request). The HTTP request conforms to the well-known XMLHttpRequest Level 2. Therefore, the descriptions thereof are omitted.

Then, the CPU 21 acquires the access token and the URI designated as the origin from the acquired HTTP request (S33). The CPU 21 specifies the application ID associated with the access token coinciding with the acquired access token, from the second database (S35). It is assumed that the second database is at the state as shown in FIG. 5. In this case, the CPU 21 specifies the application ID '1' associated with the access token 'd21c9d881eba6988be480efab45de2b9' from the second database.

Subsequently, the CPU 21 specifies the redirect URI, which will become a determination condition in S39 described later (S37). The redirect URI, which is a determination condition, is the redirect URI associated with the record ID coinciding with the application ID specified in S35, in the first database. The CPU 21 determines whether the URI acquired in S33 coincides with the redirect URI specified in S37 (S39). Upon the determination, the CPU 21 specifies the hierarchical information associated with the record ID coinciding with the application ID specified in S35, together with the redirect URI. That is, the CPU 21 acquires in S37 the redirect URI associated with the record ID coinciding with the application ID specified in S35 from the first database, and acquires in S39 the hierarchical information associated with the same record ID from the first database. In a following case, the CPU 21 determines that the URI acquired in S33 and the redirect URI specified in S37 coincide with each other. That is, when the URI acquired in S33 and the redirect URI specified in S37 are identical, the CPU 21 determines that both the information coincides (i.e., completely coincides) and determines in the affirmative in S39 (S39: Yes). Further, when the URI acquired in S33 and the part of the redirect URI of the hierarchy corresponding to the hierarchical information coincide with each other, the CPU 21 determines that both the information coincides (i.e., partially coincides) and determines in the affirmative in S39 (S39: Yes).

For example, it is assumed that the first database is at the state as shown in FIG. 3 and the second database is at the state as shown in FIG. 5. It is assumed that URI 'https://foo.example.com' designated as the origin is acquired from the HTTP request in S33 and the application ID '1' is specified in S35. In this case, in S37, the CPU 21 specifies the redirect URI 'https://qux.example.com' associated with the record ID '1' from the first database. In S39, the CPU 21 determines whether 'https://foo.example.com' and 'https://qux.example.com' coincide with each other. At this time, the CPU 21 accesses the first database, and specifies the hierarchical information 'example.com' associated with the record ID '1'. 'https://foo.example.com' includes 'example.com', which is a part of the hierarchy upper than the lowest domain hierarchy (i.e., a top level domain and a second level domain) in accordance with the hierarchical information 'example.com', of 'https://qux.example.com'. Therefore, the CPU 21 determines that both the information coincides (i.e., partially coincides) and determines in the affirmative in S39 (S39: Yes). In contrast, for example, it is assumed that 'https://www.example.jp' is specified as the redirect URI in S37 and 'www.example.jp' is specified as the hierarchical information. In this case, 'https://foo.example.com' does not include 'www.example.jp', which is a part of the hierarchy corresponding to the hierarchical information of the redirect URI. Therefore, the CPU 21 determines in the negative in S39 (S39: No).

When the affirmative determination is made in S39 (S39: Yes), the CPU 21 designates 'Authentication required' and 'Permitted domain' in an HTTP response (S41). The HTTP response is a response to the acquired HTTP request. 'Authentication required' is information indicating that the authentication is required. 'Permitted domain' is information indicating a permitted domain. The HTTP response shown in FIG. 7 is an HTTP response in which the two information is designated. In the HTTP response, 'Access-Control-Allow-Credential: true' is designated as 'Authentication required'. As 'Permitted domain', 'Access-Control-Allow-Origin: https://foo.example.com', which includes the URI 'https://foo.example.com' including the domain information of the access source, is designated.

Figure 8:
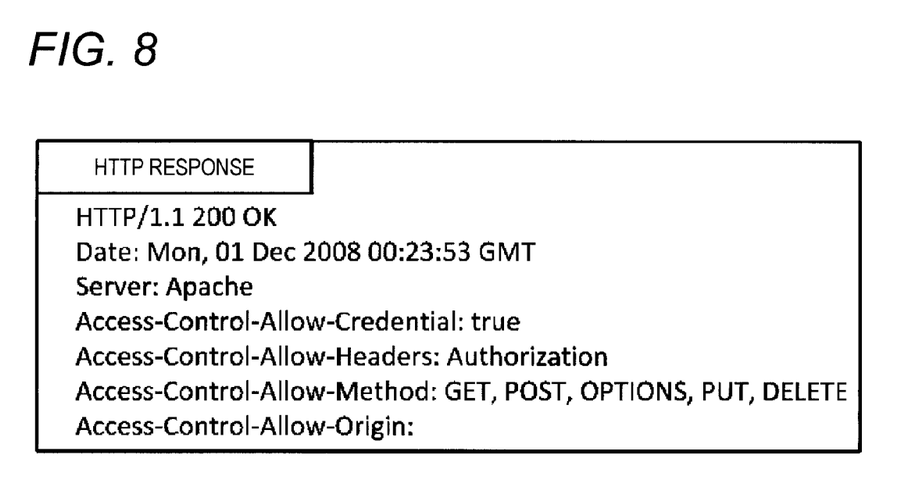
FIG. 8 illustrates an example of an HTTP response.
Figure 9:
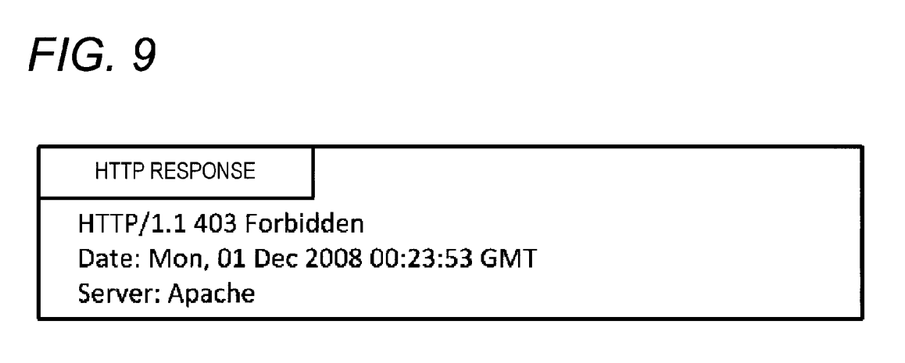
FIG. 9 illustrates another example of the HTTP response.

When the negative determination is made in S39 (S39: No) or after S41, the CPU 21 controls the transmission of the HTTP response (S43). That is, the CPU 21 outputs a transmission command of the HTTP response to the communication device 24. The destination is set as the user terminal 80, which is the transmission source of the HTTP request. Accompanied by this, the HTTP response is transmitted from the communication device 24 to the user terminal 80. When the processing of S41 has been executed, the HTTP response (see FIG. 7) including 'Authentication required' and 'Permitted domain' is transmitted, as described above. When a determination result of S39 is negative (S39: No) and the processing of S41 has not been executed yet, an HTTP response not including 'Permitted domain' (see FIG. 8) or an HTTP response not including 'Authentication required' and 'Permitted domain' (see FIG. 9) is transmitted. In the HTTP response shown in FIG. 8, the designation in 'Access-Control-Allow-Origin' is empty. The HTTP response shown in FIG. 9 includes a status explicitly indicating that there is no access authorization. The HTTP responses shown in FIGS. 7 to 9 conform to the well-known XMLHttpRequest Level 2. Therefore, the descriptions thereof are omitted.

After S43, the CPU 21 returns to S31. Then, the CPU 21 repeatedly executes the processing of S31 and thereafter. The acquisition determination processing is over when an ending instruction of the processing is received at the service providing apparatus 20 and the CPU 21 acquires the same.

Effects of Illustrative Embodiment

According to the illustrative embodiment, it is possible to accomplish following effects.

(1) In the service providing apparatus 20, the first database and the second database are stored in the RAM 23 or the internal storage 22. In the first database, the record ID, the service name, the client ID, the secret ID, the redirect URI and the hierarchical information are stored in association with each other (see FIG. 3). In the second database, the record ID, the user ID, the application ID and the access token are stored in association with each other (see FIG. 5).

In the first database and the second database, the record stored in the first database and the record stored in the second database are associated with each other by the record ID stored in the first database and the application ID stored in the second database.

In the acquisition determination processing (see FIG. 6) that is executed by the service providing apparatus 20, the application ID associated with the access token coinciding with the access token included in the HTTP request is specified from the second database (see S35 of FIG. 6). Then, the redirect URI associated with the record ID coinciding the application ID is specified from the first database, as the determination condition of S39 (see S37 of FIG. 6), and it is determined whether the URI including the domain information of the access source designated as the origin in the HTTP request coincides with the redirect URI (see S39 of FIG. 6). When the URI designated as the origin coincides with the redirect URI (see S39: Yes in FIG. 6), 'Authentication required (Access-Control-Allow-Credential: true)' and 'Permitted domain (Access-Control-Allow-Origin: https://foo.example.com)' are designated in the HTTP response (see S41 of FIG. 6 and FIG. 7). When both the URIs do not coincide with each other (see S39: No in FIG. 6), 'Authentication required' and 'Permitted domain' are not designated in the HTTP response (S41 of FIG. 6 is not executed). After that, the HTTP response is transmitted to the user terminal 80, which is the transmission source of the HTTP request (see S43 of FIG. 6).

For this reason, at the state (see T15 and T16 of FIG. 4) where the access token, which is used for connection to the resource of the user using the API of the first Web service, is issued in correspondence to the second service client 60, it is possible to permit the user terminal 80 (see FIG. 7), which accesses the first service client 40 through the Web browser, to connect to the same resource by the access token. At the state where the user terminal 80 accesses the first service client 40 through the Web browser, when connecting to the resource corresponding to the first Web service, it is not necessary to again issue the access token corresponding to the first service client 40. Thus, it is possible to smoothly implement the cooperation between the first Web service and the second Web service and the cooperation between the first Web service and the third Web service.

(2) In the first database, the hierarchical information is registered as the information indicating the domain hierarchy of the redirect URI (see FIG. 3). When the hierarchical information corresponds to a part of the redirect URI, it is possible to determine in S39 of FIG. 6 whether the first service client 40 has the common base domain to the second service client 60. By setting the hierarchical information, it is possible to appropriately set the range of the first service client 40 that is determined to be the same as the second service client 60.

Modified Embodiment

The above illustrative embodiment can be modified as follows. Some configurations of the modified embodiments may be adopted while being appropriately combined. Hereinafter, the differences from the illustrative embodiment are described and the descriptions of the same configurations are appropriately omitted.

(1) In the above illustrative embodiment, the OAuth protocol and the XMLHttpRequest protocol have been exemplified. For this reason, the access token is used as the authentication information. However, a protocol different from the OAuth protocol and the XMLHttpRequest protocol may also be used for the authentication. In this case, as the authentication information, the information that is defined in the protocol to be used and is equivalent to the access token of the OAuth protocol and XMLHttpRequest protocol is used.

(2) In the above illustrative embodiment, the domain information is stored as the hierarchical information of the first database (see FIG. 3). The hierarchical information may be a numerical value indicating a hierarchy, for example. Explanation will be made by taking the redirect URI 'https://qux.example.com' associated with the record ID '1' of the first database shown in FIG. 3 as an example. In this case, '2' may be stored as the hierarchical information. The hierarchical information '2' corresponds to the second level domain. In S37 of the acquisition determination processing shown in FIG. 6, the CPU 21 specifies the redirect URI 'https://qux.example.com' from the first database. After that, in S39, the CPU 21 determines whether the URI acquired in S33 and the redirect URI coincide with each other, as described above. At this time, the CPU 21 specifies the hierarchical information '2'. That is, the CPU 21 determines whether the URI acquired in S33 and the hierarchy part 'example.com' of the redirect URI 'https://qux.example.com', which corresponds to the hierarchical information '2', coincide (i.e., partially coincide) with each other.

(3) In the above illustrative embodiment, in S37 of the acquisition determination processing shown in FIG. 6, the redirect URI associated with the record ID coinciding with the application ID specified in S35 is specified, and it is determined in S39 whether the URI acquired in S33 and the redirect URI specified in S37 coincide with each other. The processing of S37 and S39 of FIG. 6 may also be performed as follows. That is, at the timing of S37, the CPU 21 specifies, from the first database, the hierarchical information associated with the record ID coinciding with the application ID specified in S35, as a part or all of the redirect URI becoming a determination condition. At the timing of S39, the CPU 21 determines whether the URI acquired in S33 coincides with the hierarchical information, which is a part or all of the redirect URI. For example, it is assumed that the first database is at the state as shown in FIG. 3 and the second database is at the state as shown in FIG. 5. It is assumed that the URI 'https://foo.example.com' designated as the origin is acquired from the HTTP request in S33 of FIG. 6 and the application ID '1' is specified in S35. In this case, at the timing of S37, the CPU 21 specifies, from the first database, the hierarchical information 'example.com' associated with the record ID '1' as a part of the redirect URI becoming the determination condition. At the timing of S39, the CPU 21 determines whether 'https://foo.example.com' and 'example.com' coincide with each other. 'https://foo.example.com' includes 'example.com'. In other words, 'https://foo.example.com' is the upper hierarchy (the top level domain and the second level domain) of the lowest domain hierarchy and coincides (i.e., partially coincides) with 'example.com'. Therefore, the CPU 21 determines in the affirmative in S39 (S39: Yes). In contrast, for example, it is assumed that 'www.example.jp' is specified in S37. In this case, 'https://foo.example.com' does not include 'www.example.jp'. Therefore, the CPU 21 determines in the negative in S39 (S39: No).

(4) In the above illustrative embodiment, the record ID of the first database is stored as the application ID of the second database (see FIG. 5). The identification information, which is to be registered as the application ID in the second database, may be the information other than the record ID stored in the first database. For example, in the second database, the client ID stored in the first database may be stored as the application ID. That is, it is only necessary that the application ID of the second database is information capable of being associated with the record stored in the first database.

The first database and the second database may be configured as a single database. That is, the first database and the second database may be configured as a single database in which the record ID, the service name, the client ID, the secret ID, the redirect URI, the hierarchical information, the user ID and the access token are stored with being associated. In this database, the application ID capable of associating the record stored in the first database and the record stored in the second database may be omitted. In this case, the processing of S35 in the acquisition determination processing of FIG. 6 is omitted. In S37 of FIG. 6, the redirect URI associated with the access token coinciding with the access token acquired in S33 of FIG. 6 is acquired, and the processing of S39 and thereafter in FIG. 6 is performed in the same manner as the above illustrative embodiment.

What is claimed is:

1. A service providing apparatus configured to provide a first Web service through the Internet, the service providing apparatus comprising:
   a storage;
   a communication device configured to connect the service providing apparatus to the Internet;
   a hardware processor; and
   memory storing computer executable instructions, when executed by the hardware processor, causing the service providing apparatus to perform:
   acquiring a resource request through the communication device, the resource request requesting connection to a resource corresponding to the first Web service, being transmitted from a terminal apparatus having accessed through a Web browser a first service client configured to provide a second Web service, and including domain information of the first service client and authentication information related to the connection to the resource corresponding to the first Web service and issued in correspondence to a second service client configured to provide a third Web service,
   specifying, from the storage, destination information which is associated with the authentication information stored in the storage and coinciding with the authentication information included in the acquired resource request, the storage being configured to store, in association with each other, first identification information corresponding to a predetermined service client configured to provide a predetermined Web service, the destination information corresponding to an address to which permission information permitting connection to the resource corresponding to the first Web service is to be transmitted, and the authentication information related to the connection to the resource corresponding to the first Web service and issued in correspondence to the predetermined service client identified by the first identification information;
   determining whether the domain information included in the acquired resource request and the specified destination information coincide with each other,
   transmitting a first response to the resource request from the communication device to the terminal apparatus when the domain information and the destination information coincide with each other, and transmitting a second response to the resource request from the communication device to the terminal apparatus when the domain information and the destination information do not coincide with each other, the first response including information indicating that authentication is required and the domain information, and the second response not including the domain information;
   generating an access token conforming to an OAuth protocol, as the authentication information issued in correspondence to the predetermined service client identified by the first identification information, the generated access token being configured to be stored in the storage in association with the stored information, as the authentication information issued in correspondence to the predetermined service client identified by the first identification information,
   wherein the acquiring comprises acquiring the resource request including the domain information and the access token as the authentication information issued in correspondence to the second service client,
   wherein the specifying comprises specifying, from the storage, the destination information which is associated with the access token stored in the storage and coinciding with the access token included in the acquired resource request,
   wherein the acquiring comprises acquiring an HTTP request conforming to an XMLHttpRequest protocol as the resource request,
   wherein the specifying comprises specifying, from the storage, the destination information which is associated with the access token stored in the storage and coinciding with the access token included in the acquired HTTP request, and
   wherein the transmitting of the first response and the transmitting of the second response from the communication device to the terminal apparatus are performed in response to the acquired HTTP request.

2. The service providing apparatus according to claim 1, wherein the specifying comprises specifying, from a second storage, second identification information which is associated with the authentication information stored in the second storage and coinciding with the authentication information included in the acquired resource request, and specifying, from a first storage, the destination information which is associated with the first identification information corresponding to the specified second identification information, the storage including the first storage and the second storage, the first storage being configured to store, in association with each other, the first identification information and the destination information, and the second storage being configured to store, in association with each other, the second identification information corresponding to the first identification information and the authentication information related to the connection to the resource corresponding to the first Web service and issued in correspondence to the predetermined service client identified by the first identification information.

3. The service providing apparatus according to claim 1, wherein the determining comprises determining whether the domain information and the destination information coincide with each other as regards a hierarchy upper than the lowest domain hierarchy, and
wherein the transmitting of the first response from the communication device to the terminal apparatus is performed when the domain information and the destination information coincide with each other as regards the hierarchy upper than the lowest domain hierarchy, and the transmitting of the second response from the communication device to the terminal apparatus is performed when the domain information and the destination information do not coincide with each other as regards the hierarchy upper than the lowest domain hierarchy.

4. The service providing apparatus according to claim 1, wherein the determining comprises determining whether the domain information and the destination information coincide with each other in a domain hierarchy corresponding to hierarchical information, the hierarchical information being configured to be stored in the storage in association with the stored information and indicating a domain hierarchy of the destination information, and wherein the transmitting of the first response from the communication device to the terminal apparatus is performed when the domain information and the destination information coincide with each other as regards the domain hierarchy corresponding to the hierarchical information, and the transmitting of the second response from the communication device to the terminal apparatus is performed when the domain information and the destination information do not coincide with each other as regards the domain hierarchy corresponding to the hierarchical information.

5. A non-transitory computer readable storage medium storing a program, when executed by a hardware processor, causing a service providing apparatus configured to provide a first Web service through the Internet to perform:

acquiring a resource request through a communication device of the service providing apparatus configured to connect the service providing apparatus to the Internet, the resource request requesting connection to a resource corresponding to the first Web service, being transmitted from a terminal apparatus having accessed through a Web browser a first service client configured to provide a second Web service, and including domain information of the first service client and authentication information related to the connection to the resource corresponding to the first Web service and issued in correspondence to a second service client configured to provide a third Web service;

specifying, from a storage, destination information which is associated with authentication information stored in the storage and coinciding with the authentication information included in the acquired resource request, the storage being configured to store, in association with each other, first identification information corresponding to a predetermined service client configured to provide a predetermined Web service, the destination information corresponding to an address to which permission information permitting connection to the resource corresponding to the first Web service is to be transmitted, and the authentication information related to the connection to the resource corresponding to the first Web service and issued in correspondence to the predetermined service client identified by the first identification information;

determining whether the domain information included in the acquired resource request and the specified destination information coincide with each other;

transmitting a first response to the resource request from the communication device to the terminal apparatus when the domain information and the destination information coincide with each other, and transmitting a second response to the resource request from the communication device to the terminal apparatus when the domain information and the destination information do not coincide with each other, the first response including information indicating that authentication is required and the domain information, and the second response not including the domain information;

wherein the program, when executed by a hardware processor, further causes the service providing apparatus to perform:

generating an access token conforming to an OAuth protocol, as the authentication information issued in correspondence to the predetermined service client identified by the first identification information, the generated access token being configured to be stored in the storage in association with the stored information, as the authentication information issued in correspondence to the predetermined service client identified by the first identification information, wherein the acquiring comprises acquiring the resource request including the domain information and the access token as the authentication information issued in correspondence to the second service client, wherein the specifying comprises specifying, from the storage, the destination information which is associated with the access token stored in the storage and coinciding with the access token included in the acquired resource request, wherein the acquiring comprises acquiring an HTTP request conforming to an XMLHttpRequest protocol as the resource request, wherein the specifying comprises specifying, from the storage, the destination information which is associated with the access token stored in the storage and coinciding with the access token included in the acquired HTTP request, and wherein the transmitting of the first response and the transmitting of the second response from the communication device to the terminal apparatus are performed in response to the acquired HTTP request.

6. The computer readable storage medium according to claim 5, wherein the specifying is performed by specifying, from a second storage, the second identification information which is associated with the authentication information stored in the second storage and coinciding with the authentication information included in the acquired resource request, and specifying, from a first storage, the destination information which is associated with the first identification information corresponding to the specified second identification information, the storage including the first storage and the second storage, the first storage being configured to store, in association with each other, the first identification information and the destination information, and the second storage being configured to store, in association with each other, the second identification information corresponding to the first identification information and the authentication information related to the connection to the resource corresponding to the first Web service and issued in correspondence to the predetermined service client identified by the first identification information.

7. The computer readable storage medium according to claim 5, wherein the determining comprises determining whether the domain information and the destination information coincide with each other as regards a hierarchy upper than the lowest domain hierarchy, and wherein the transmitting of the first response from the communication device to the terminal apparatus is performed when the domain information and the destination information coincide with each other as regards the hierarchy upper than the lowest domain hierarchy, and the transmitting of the second response from the communication device to the terminal apparatus is performed when the domain information and the destination information do not coincide with each other as regards the hierarchy upper than the lowest domain hierarchy.

8. The computer readable storage medium according to claim 5,
wherein the determining comprises determining whether the domain information and the destination information coincide with each other in a domain hierarchy corresponding to hierarchical information, the hierarchical information being configured to be stored in the storage in association with the stored information and indicating a domain hierarchy of the destination information, and
wherein the transmitting of the first response from the communication device to the terminal apparatus is performed when the domain information and the destination information coincide with each other as regards the domain hierarchy corresponding to the hierarchical information, and the transmitting of the second response from the communication device to the terminal apparatus is performed when the domain information and the destination information do not coincide with each other as regards the domain hierarchy corresponding to the hierarchical information.

9. A service providing method for a service providing apparatus configured to provide a first Web service through the Internet, the method comprising:
acquiring a resource request through a communication device of the service providing apparatus configured to connect the service providing apparatus to the Internet, the resource request requesting connection to a resource corresponding to the first Web service, being transmitted from a terminal apparatus having accessed through a Web browser a first service client configured to provide a second Web service, and including domain information of the first service client and authentication information related to the connection to the resource corresponding to the first Web service and issued in correspondence to a second service client configured to provide a third Web service;
specifying, from a storage, destination information which is associated with authentication information stored in the storage and coinciding with the authentication information included in the acquired resource request, the storage being configured to store, in association with each other, first identification information corresponding to a predetermined service client configured to provide a predetermined Web service, the destination information corresponding to an address to which permission information permitting connection to the resource corresponding to the first Web service is to be transmitted, and the authentication information related to the connection to the resource corresponding to the first Web service and issued in correspondence to the predetermined service client identified by the first identification information;
determining whether the domain information included in the acquired resource request and the specified destination information coincide with each other;
transmitting a first response to the resource request from the communication device to the terminal apparatus when the domain information and the destination information coincide with each other, and transmitting a second response to the resource request from the communication device to the terminal apparatus when the domain information and the destination information do not coincide with each other, the first response including information indicating that authentication is required and the domain information, and the second response not including the domain information;
generating an access token conforming to an OAuth protocol, as the authentication information issued in correspondence to the predetermined service client identified by the first identification information, the generated access token being configured to be stored in the storage in association with the stored information, as the authentication information that is correspondence to the predetermined service client identified by the first identification information,
wherein the acquiring comprises acquiring the resource request including the domain information and the access token as the authentication information issued in correspondence to the second service client,
wherein the specifying comprises specifying, from the storage, the destination information which is associated with the access token stored in the storage and coinciding with the access token included in the acquired resource request,
wherein the acquiring comprises acquiring an HTTP request conforming to an XMLHttpRequest protocol as the resource request,
wherein the specifying comprises specifying, from the storage, the destination information which is associated with the access token stored in the storage and coinciding with the access token included in the acquired HTTP request, and
wherein the transmitting of the first response and the transmitting of the second response from the communication device to the terminal apparatus are performed in response to the acquired HTTP request.

10. The service providing method according to claim 9, wherein the specifying is performed by specifying, from a second storage, the second identification information which is associated with the authentication information stored in the second storage and coinciding with the authentication information included in the acquired resource request, and specifying, from a first storage, the destination information which is associated with the first identification information corresponding to the specified second identification information, the storage including the first storage and the second storage, the first storage being configured to store, in association with each other, the first identification information and the destination information, and the second storage being configured to store, in association with each other, the second identification information corresponding to the first identification information and the authentication information related to the connection to the resource corresponding to the first Web service and issued in correspondence to the predetermined service client identified by the first identification information.

11. The service providing method according to claim 9, wherein the determining comprises determining whether the domain information and the destination information coincide with each other as regards a hierarchy upper than the lowest domain hierarchy, and wherein the transmitting of the first response from the communication device to the terminal apparatus is performed when the domain information and the destination information coincide with each other as regards the hierarchy upper than the lowest domain hierarchy, and the transmitting of the second response from the communication device to the terminal apparatus is performed when the domain information and the destination information do not coincide with each other as regards the hierarchy upper than the lowest domain hierarchy.

12. The service providing method according to claim 9, wherein the determining comprises determining whether the domain information and the destination information coincide with each other in a domain hierarchy corresponding to hierarchical information, the hierarchical information being configured to be stored in the storage in association with the stored information and indicating a domain hierarchy of the destination information, and wherein the transmitting of the first response from the communication device to the terminal apparatus is performed when the domain information and the destination information coincide with each other as regards the domain hierarchy corresponding to the hierarchical information, and the transmitting of the second response from the communication device to the terminal apparatus is performed when the domain information and the destination information do not coincide with each other as regards the domain hierarchy corresponding to the hierarchical information.

\* \* \* \* \*